No. 842,416. PATENTED JAN. 29, 1907.
J. E. NELSON.
MECHANICAL MOVEMENT.
APPLICATION FILED FEB. 17, 1906.

3 SHEETS—SHEET 1.

Witnesses
T. L. Mcclure
James F. Crown

Inventor
John E. Nelson
By Geo. S. Varnum
Attorney

No. 842,416. PATENTED JAN. 29, 1907.
J. E. NELSON.
MECHANICAL MOVEMENT.
APPLICATION FILED FEB. 17, 1906.
3 SHEETS—SHEET 2.
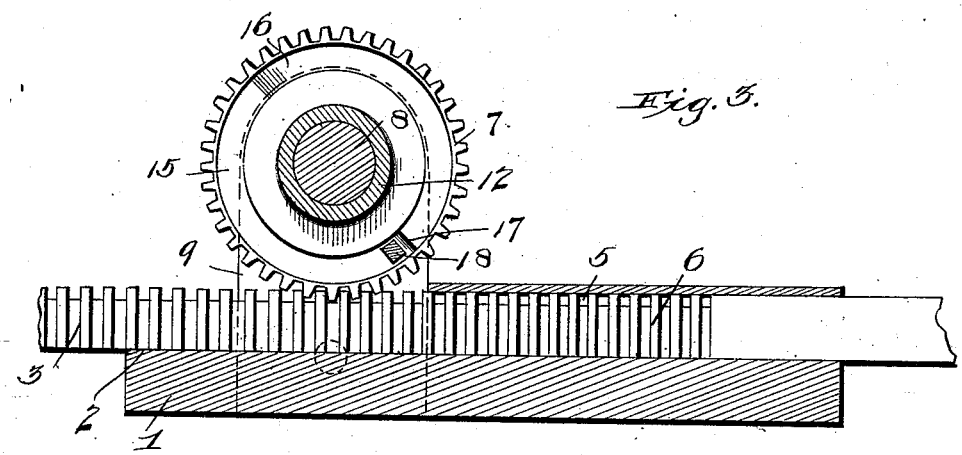
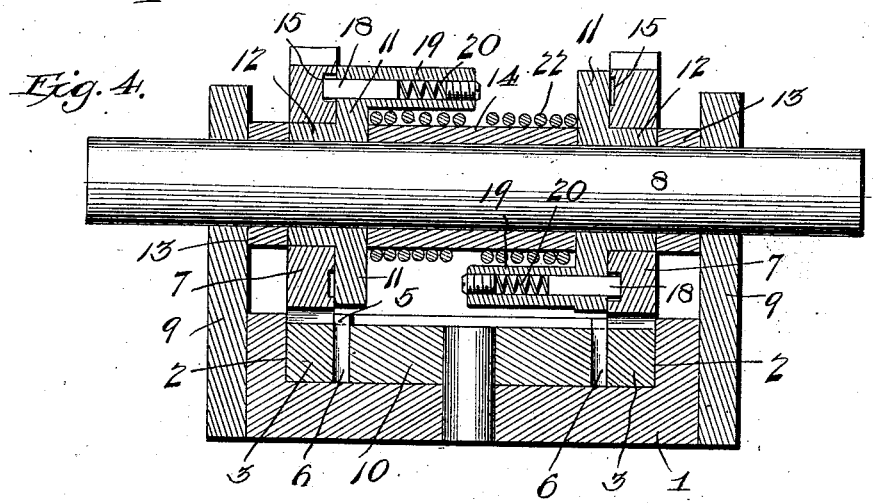
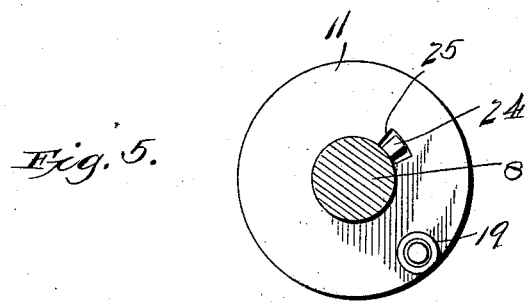
Witnesses
Inventor
John E. Nelson
By
Attorney No. 842,416. PATENTED JAN. 29, 1907.
J. E. NELSON.
MECHANICAL MOVEMENT.
APPLICATION FILED FEB. 17, 1906.

3 SHEETS—SHEET 3.

Inventor
John E. Nelson

Witnesses
T. L. Mockave
James F. Crown

By Geo. S. Varham
Attorney

UNITED STATES PATENT OFFICE.

JOHN E. NELSON, OF CHICAGO, ILLINOIS.

MECHANICAL MOVEMENT.

No. 842,416.  Specification of Letters Patent.  Patented Jan. 29, 1907.

Application filed February 17, 1906. Serial No. 301,576.

*To all whom it may concern:*

Be it known that I, JOHN E. NELSON, a citizen of the United States, residing at Chicago, in the county of Cook and State of Illinois, have invented new and useful Improvements in Mechanical Movements, of which the following is a specification.

This invention relates to mechanical movements, and particularly to that type of the latter for converting reciprocating into rotary movements and adapted for use on automobiles, traction and locomotive engines, or other classes of vehicles to which it may be applicable. In fact, it is proposed to use the movement in connection with any mechanism where it is desired to convert reciprocating into rotary movements.

The object of the invention is to overcome the inconvenience and irregularity in operation of a crank, eccentric, or analogous shaft or transmitting element and to avoid lost motion and dead-center incident to the use of crank and eccentric devices. The improved movement is also equipped with means for absorbing and relieving a shaft of a jerk or irregular vibration that is particularly apparent in motion-transmitting devices connected to the piston-rods of gas-engines.

A still further object of the invention is to embody a series of coöperating elements in a mechanical movement having direct connection or engagement which will result in an instant operation of the driven element.

In its broadenst sense the mechanical movement includes in its organization reciprocating connecting devices actuating an intermediate movement-transmitting element and rotary devices coöperating with a driven shaft and directly actuated by the reciprocating devices in alternation.

Figure 1:
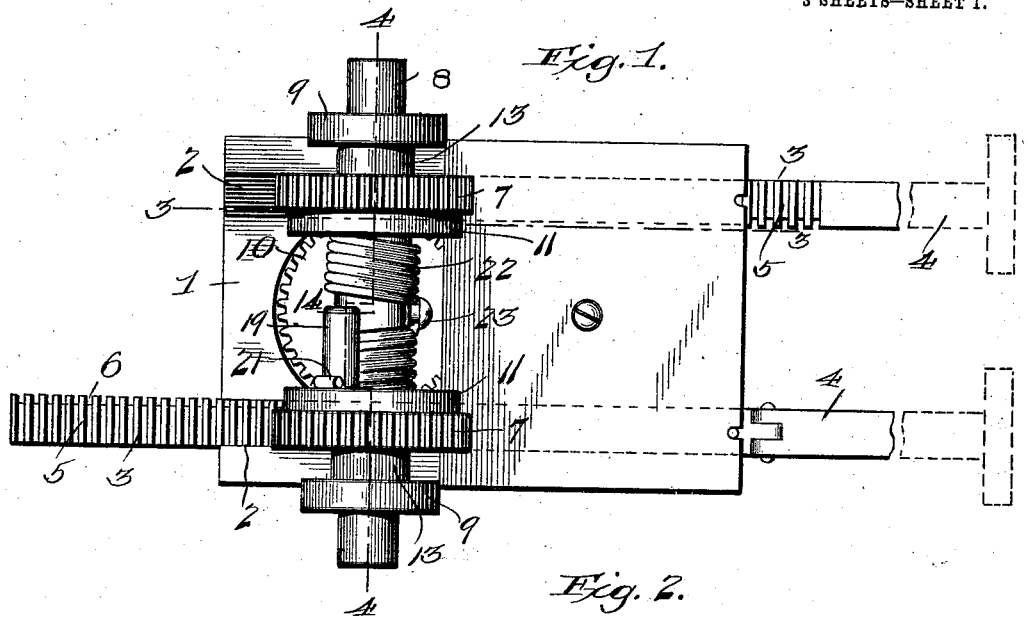
Figure 2:
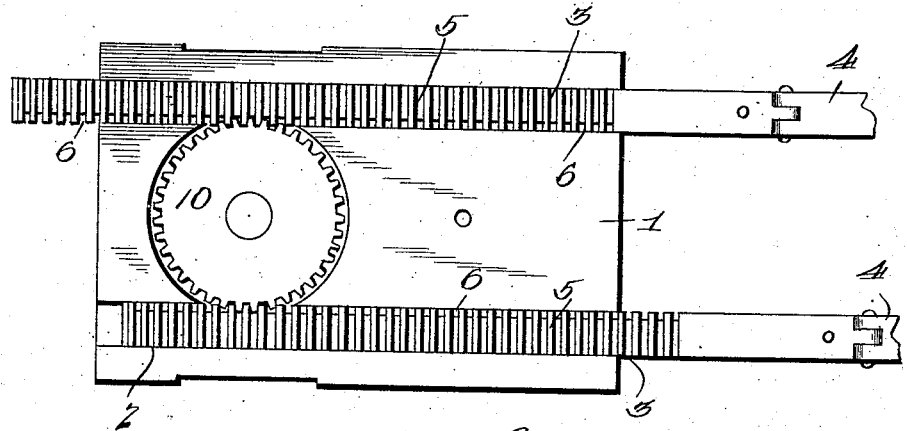
Figure 9:
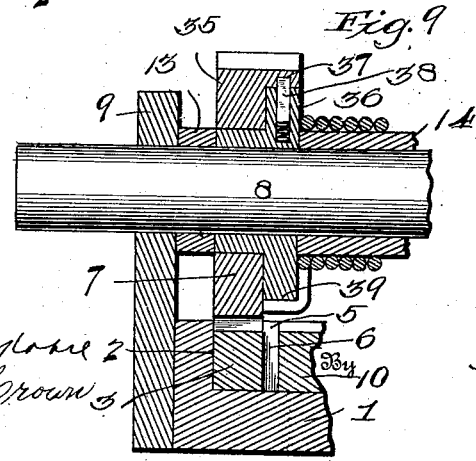
Figure 6:
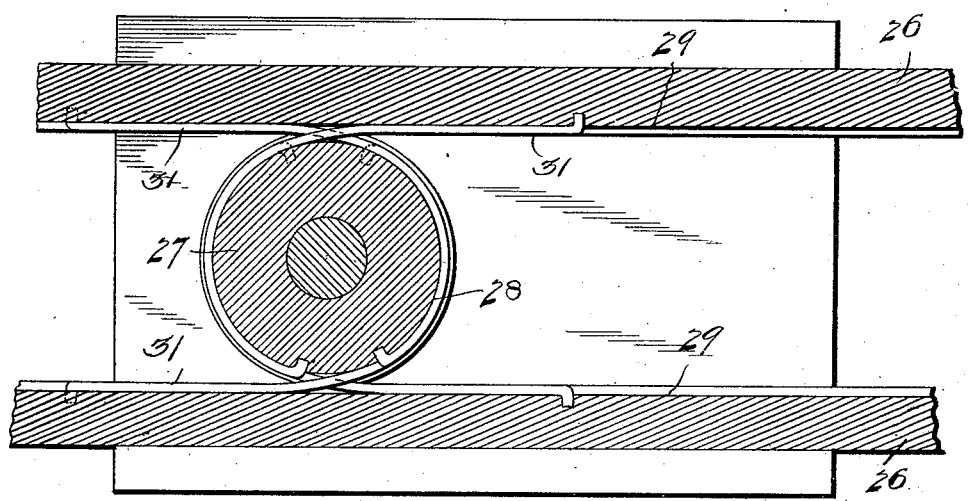
Figure 7:
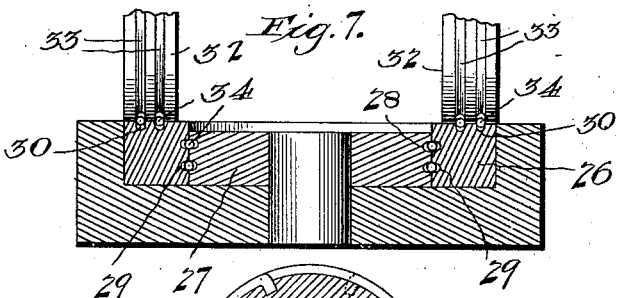
Figure 8:
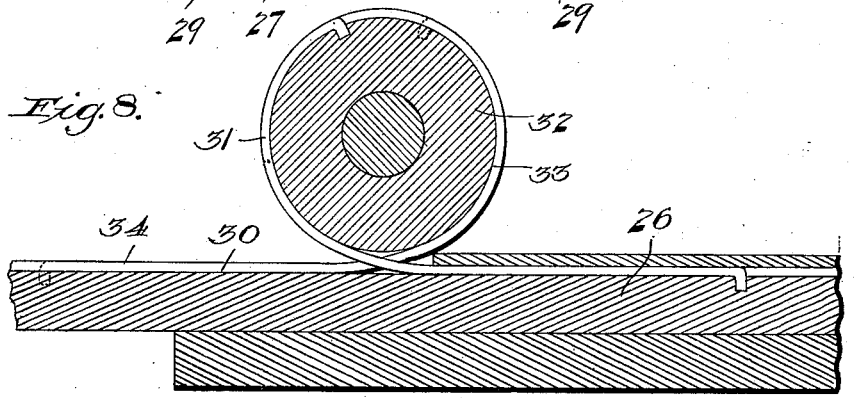

In the drawings, Figure 1 is a top plan view of a mechanical movement embodying the features of invention. Fig. 2 is a similar view showing parts thereof removed. Fig. 3 is a longtiudinal vertical section on the line 3 3, Fig. 1. Fig. 4 is a transverse vertical section taken on the line 4 4, Fig. 1. Fig. 5 is a detail sectional elevation of portions of the movement. Fig. 6 is a horizontal section through the lower portion of the mechanical movement, showing a modification thereof. Fig. 7 is a transverse vertical section through the modified form of the movement. Fig. 8 is a longitudinal section through the modified form of the movement. Fig. 9 is a detail cross-section showing a further modification of the mechanism.

Similar numerals of reference are employed to indicate corresponding parts throughout the several views.

The numeral 1 designates a bed or base having longitudinal grooves 2 near the opposite sides, in which are reciprocatingly mounted elongated slides 3, to which the piston-rods or couplings 4 of independent cylinders are attached, as shown by Figs. 1 and 2.

As shown by Figs. 1, 2, 3, and 4, the slides 3 are formed with top teeth 5 and inner side teeth 6, the top teeth being in continual mesh with pinions 7, mounted on a shaft 8, which constitutes the driven element and has bearing in suitable uprights or other analogous means 9.

It will be understood that the shaft 8 may be of any length and have any of the well-known devices applied thereto for transmitting driving power therefrom.

Horizontally disposed in the bed or base 1 is a motion-transmitting element or gear 10, which meshes with the inner side teeth 6 of the slides 3, and the office or function of this motion-transmitting element is to control the movement of one pinion 7 with respect to the other during the alternate reciprocation of the said slides 3 to preserve synchronous operation of the latter and to maintain a continuous rotation of the shaft 8 in one direction by devices which will be more fully hereinafter set forth. Movable with the shaft 8 are opposite disks 11, having sleeves 12 extending oppositely therefrom, on which the pinions 7 have bearing, and between the outer ends of the said sleeves 12 and the adjacent portions of the bearing projections 9 space-sleeves 13 are interposed to maintain the several parts in proper relative positions. Between the inner opposing faces of the disks 11 a space-sleeve 14 also embraces the shaft 8, and through the use of these space-sleeves the pinions 7 are always held in accurate engagement with the top teeth 5 of the slides 3. The inner face of each pinion 7 is formed with a circumferential groove 15, having a portion of the outer wall or base thereof inclined inwardly, as at 16, to a drop or shoulder 17 to provide a cam-surface or cam means to coöperate with a spring-actuated longitudinally-movable spline-pin 18, projecting outwardly through the adjacent disk 11 and having the greater portion thereof inclosed within a tubular casing 19, containing a spring 20, against which the inner end of the said pin 18 has direct bearing. The pinions 7 rotate on the oppositely-projecting hubs or collars 12 of the said disks 11, and the spline-pins 18 serve as coupling means between the pinions and disks to directly transfer the motion of the pinions as set up by the slides 3 to the shaft 8, the cam-faces 16 compensating for alternate movement or actuation of the pinions by the slides 3 and to provide a play-off or release of each pinion which at the time is not actuated by its slide and when the remaining pinion and slide are working to transmit motion to the shaft 8. In other words, this coupling between the disks and pinions compensates for the reverse reciprocating movement of the two slides 3 and prevents the retractive movement of one slide interfering with the projective movement of the other slide, and thus a continuous rotation of the shaft 8 in one direction ensues without interruption or in the least under the influence of dead-center and with a minimized amount of friction which is very material in devices of this class. It is preferred to make the outer projecting terminals of the spline-pins 18 angular or square in cross-section, and when the ends of said pins contact with the cam-surfaces 16 they ride over the latter and are gradually pressed inwardly until the shoulders 17 are clear, when said pins are immediately forced outwardly by the springs engaging the same without check in the least of the operation of the parts, and particularly the shaft 8.

The tubular casings project inwardly over the space-sleeve 14 and provide means for attaching thereto the opposite terminals 21 of a looped spring 22, centrally held by a screw 23 to the sleeve 14 and coiled in reverse directions from the center toward opposite ends of said sleeve. The function of this spring is to absorb all jars and jerks or other irregular movements of the slides and pinions which may be due or caused by the irregular movement of the piston or pistons of a gas-engine. By taking up this jerk or irregular movement it will be observed that the shaft 8 will not be affected thereby and the rotation of such shaft will remain constant and regular. The shaft 8 also has studs 24 projecting therefrom, which engage slots 25, formed in the disks 11, the object of these studs and slots being to accommodate for the thrust of the shaft.

In Figs. 6, 7, and 8 a modification of the construction is shown, the slides 26 in this instance being toothless and the horizontal motion-transmitting element 27 being in the form of a disk having a peripheral groove 28. The slides 26 also have side and top grooves 29 and 30, and attached to each slide are the two extremities of chains or analogous flexible devices 31, which are passed around the motion-transmitting element 27 in reverse directions and also terminally secured thereto. These chains or other flexible devices 31 are arranged in reverse pairs with respect to the element 27 and the slides 29. The pinions in this instance are replaced by rotatable disks 32, having peripheral grooves 33, engaged by reversely-arranged chains or other flexible devices 34, extending in opposite directions over the top portions of the slides 26 and fitting in the grooves 30 of the latter. It will be seen that in this modification the motion-transmitting element 27 and the slides 26, as well as the disks 32, have precisely the same operation as in the first-described form of the movement and compensate for the alternate movement of the said slides, the disks 11, heretofore described, and the remaining parts of the mechanism being the same.

In the further modification of the mechanism shown by Fig. 1 each pinion 35 has an inwardly-projecting flange covering the disk 36, and in said flange is a cam-groove 37, extending therearound to receive the end of pin 38, radially disposed in said disk. The one end of the spring 22 in this instance will be caught in a slot 39 in the disk.

To accommodate various applications of the invention, changes in the proportions and minor details may be resorted to without departing from the spirit of the invention, the latter contemplating the direct connection and engagement of the several elements as heretofore set forth and essentially comprising a driven shaft having rotatable devices therefor coöperating with loose rotatable elements actuated by slides alternately reciprocating in opposite directions and connected to the piston-rods or other analogous devices which are moved by the pistons in cylinders and to convert reciprocating into rotary motion.

What I claim is—

1. In a mechanical movement, alternately-reciprocating devices, a rotatable motion-transferring element between the said devices, and synchronously operating the latter, a drive-shaft having loose rotatable means thereon in operative relation to said reciprocating devices and directly actuated by the latter, and disks fast to the shaft and movably engaged by the said loose rotatable means.

2. In a mechanical movement, the combination of a driving-shaft, reciprocating devices having reverse movement in alternation, rotatable means between the said reciprocating devices for synchronously operating the latter and means directly coöperating with the said reciprocating devices and engaging the shaft.

3. In a mechanical movement, the combination of a driving-shaft, reciprocating devices having reverse movement in alternation, rotatable means between the said reciprocating devices for synchronously operating the latter and mechanism directly coöperating with the said reciprocating devices and engaging the shaft and provided with means for compensating for the reverse movement of the said reciprocating devices.

4. In a mechanical movement, the combination of reversely-operating reciprocating devices, a drive-shaft, rotatable means between the said reciprocating devices for synchronously operating the same and mechanism directly coöperating with the said reciprocating devices and the shaft and provided with means for compensating for the reverse movement of the said reciprocating devices.

5. In a mechanical movement, the combination of reversely-operating reciprocating devices, a drive-shaft, a rotatable motion-transmitting element between and engaging the reciprocating devices for synchronously operating the latter, and mechanism directly coöperating with the said reciprocating devices and the shaft.

6. In a mechanical movement, the combination of reversely-operating reciprocating devices, a drive-shaft, a horizontally-disposed rotatable motion-transmitting element directly coöperating with the reciprocating devices, mechanism engaging the drive-shaft and also directly coöperating with the said reciprocating devices.

7. In a mechanical movement, the combination of reversely-reciprocating alternately-moving devices, a drive-shaft, mechanism directly coöperating with the reciprocating devices and the shaft, and spring means surrounding the shaft and engaging said mechanism to absorb the jar or jerk of the reiprocating devices.

8. In a mechanical movement, the combination of reversely-operating reciprocating slides having teeth on the upper and inner edge portions thereof, a toothed motion-transmitting element interposed between and engaging the side teeth of said reciprocating slides, a drive-shaft having pinions thereon held in continual engagement with the top teeth of the slides, and disks for directly transmitting the motion of the slides to the shaft and with which the pinions have loose engagement.

9. In a mechanical movement, the combination of reversely-operating reciprocating slides provided with teeth, a toothed motion-transmitting element interposed between and engaging a portion of the teeth of said slides, a drive-shaft having pinions thereon held in continual engagement with the remaining teeth of the slides, and disks for directly transmitting motion to the drive-shaft and carrying outwardly-projecting movable spline-pins, the inner sides of the pinions being grooved and the grooves having cam-faces terminating in drops to coöperate with the said pins.

In testimony whereof I affix my signature in presence of two witnesses.

JOHN E. NELSON.

Witnesses:
 CHARLES S. HYER,
 FRED WANNAMAKER.